United States Patent

Neuenfeldt et al.

[11] Patent Number: 5,452,529
[45] Date of Patent: Sep. 26, 1995

[54] RETAINING DEVICE

[75] Inventors: Frederick E. Neuenfeldt, Wauwatosa; Darryl L. Immel, Waterford; Carl D. Swick, Mukwonago, all of Wis.

[73] Assignee: Harnischfeger Corporation, Brookfield, Wis.

[21] Appl. No.: 111,425

[22] Filed: Aug. 25, 1993

[51] Int. Cl.⁶ .............................. 37 395; 403 374; 403 320
[52] U.S. Cl. .......................................... 37/455; E02F/9/28
[58] Field of Search ............................... 37/451, 450, 452, 37/453, 454, 455, 456, 457, 458, 446, 398, 395; 403/374, 373, 355, 320, 21, 22

[56] References Cited

U.S. PATENT DOCUMENTS

| | | | |
|---|---|---|---|
| 311,769 | 2/1885 | Mackay | 403/355 |
| 495,783 | 4/1903 | Cavallaro | 403/22 |
| 943,775 | 12/1909 | Exton et al. | 37/454 |
| 1,917,431 | 7/1933 | Clark | 37/455 |
| 1,992,591 | 2/1935 | Whisler | 37/141 |
| 3,455,040 | 7/1969 | Ratkowski | 37/142 |
| 3,664,044 | 5/1972 | Hahn | 37/142 R |
| 4,120,105 | 10/1978 | Stepe | 37/142 R |
| 4,136,469 | 1/1979 | Zepf | 37/141 T |
| 4,238,896 | 12/1980 | Lanz et al. | 37/141 R |
| 4,267,653 | 5/1981 | Hahn et al. | 37/457 |
| 4,329,794 | 5/1982 | Rogers | 37/115 |
| 4,357,765 | 11/1982 | Seykora | 37/142 R |
| 4,414,764 | 11/1983 | Johansson et al. | 37/141 T |
| 4,433,496 | 2/1984 | Jones et al. | 37/141 R |
| 4,449,309 | 5/1984 | Hemphill | 37/141 R |
| 4,704,812 | 11/1987 | Paramore, Jr. | 37/141 R |
| 4,782,607 | 11/1988 | Frisbee et al. | 37/141 T |
| 4,903,546 | 2/1990 | Quintille | 403/21 X |
| 4,932,145 | 6/1990 | Reeves Jr. | 37/141 T |
| 5,263,351 | 11/1993 | Berg, III | 403/374 X |

Primary Examiner—Randolph A. Reese
Assistant Examiner—Victor Batson
Attorney, Agent, or Firm—Jansson & Shupe, Ltd.

[57] ABSTRACT

A digging bucket has a lip, a lip aperture with a forward surface, a digging component mounted on the lip, and a component retaining device. The device comprises a keeper wedge with protrusions bearing against the component and a wedge member interposed between the forward surface and the component. In the improvement, the keeper wedge has at least one angled face and the wedge member has a pair of angled faces, at least one of which bears against the angled face of the keeper wedge. The wedge member is retained in position by a tension bolt extending through the aperture. Several embodiments are disclosed with wedge members having one or two wedges to urge the keeper wedge (and thus the digging component) rearward tightly against the lip.

13 Claims, 7 Drawing Sheets

RETAINING DEVICE

FIELD OF THE INVENTION

This invention is related generally to digging, excavating and dragline mining equipment and, more particularly, to aspects of the digging buckets of such equipment.

BACKGROUND OF THE INVENTION

Certain types of earth-moving and excavating machinery are equipped with digging buckets (having teeth facing toward the machine) or dippers (having teeth facing away from the machine) capable of holding anywhere from a fraction of a cubic yard to several cubic yards of material. As used in this specification, the term "bucket" is a general term referring to a bucket, a dipper or to any other type of scoop-like device attached to a machine for digging.

One type of machine using a large, cable-suspended digging bucket is called a walking dragline. Such draglines are often used in strip mining to remove "overburden" material covering, e.g., coal or ore, and to remove the product being mined.

Digging is by lowering the bucket onto the material to be removed and dragging the bucket toward the machinery deck. As the bucket is drawn toward the machine, its digging teeth bite into the material as the bucket fills. After the bucket is filled, the boom is swung laterally and the bucket tipped for dumping the load.

Other types of digging machines such as front end loaders, back hoes, hydraulic excavators, mining shovels and the like are also equipped with digging buckets and sometimes such buckets are of very substantial capacity. Unlike the bucket of a dragline, the bucket of a front end loader is attached to and manipulated by two or three stiff arm-like members which are manipulated by hydraulic cylinders.

A large bucket, particularly a dragline bucket, often has a bucket lip to which is attached various components to protect the lip and to dig. More specifically, such a bucket has several tooth assemblies mounted in spaced-apart relationship along the lip and lip shrouds are positioned between the tooth assemblies to protect the lip. The reason for the shrouds is that the lip is a very expensive equipment component to replace (especially in larger buckets) and the shrouds and tooth assemblies are considered as expendable replacement parts.

To give some idea of size, the tip of a digging tooth for a large bucket may have a length of 13 inches or so (as measured in the direction of digging), a width of about 12 inches and weigh about 160 pounds. And a large bucket itself may weight several thousand pounds. The lip shrouds are correspondingly large.

More specifically, each hollow, sheath-like tip is fitted over and supported by a tooth "nose" or base. The tip (which is generally hollow to receive the base) has a pair of apertures, one each in the top and bottom tip plate. The base has a single vertical aperture. When the tip is fully seated on the base, the apertures are aligned and form a single vertical "top-to-bottom" aperture.

Conventional lip shrouds and digging tooth assemblies are retained on the lip (or, in the case of a tooth assembly, on a base piece) by a wedge pin alone or by a wedge-shaped member used with a wedge pin. Such member is sized so that when in place, a small aperture remains. A wedge-shaped pin is driven (often with a sledge hammer) into such aperture and retains the shroud or the tip in place solely by friction. Such arrangement is configured in anticipation of periodic shroud, tip and/or wedge pin replacement. Both the shroud and the tooth assemblies aid in digging and in this specification, the term "digging component" refers to either a tooth assembly or a lip shroud.

Examples of digging buckets and ways to retain components thereon are shown in U.S. Pat. Nos. 4,414,764 (Johansson et al.), 4,782,607 (Frisbee et al.), 4,136,469 (Zepf) and others.

The conventional wedge pin arrangement is attended by a number of disadvantages. One is that, over time, the wedge pins are knocked out or they can simply become loose and fall out. The retained piece then falls off and causes loss of the tip and the shroud. Not only are these parts expensive to replace, their entry into auxiliary equipment, e.g., crushers, can badly damage such equipment. Another disadvantage is that the wedge pin is usually hardened and hammering such pin may cause it to splinter, sending shards of metal flying like shrapnel.

Yet another disadvantage is that the hardened wedge pin lacks significant resilience or ductility and, with slight wear, this fact promotes pin loosening. In other words, the parts are not self-adjusting to any significant degree.

Even if the wedge pin remains secure over the life of the tip, pin removal preparatory to replacement of the digging component is a substantial task. Because such pins are driven from the top downward, they must be removed by driving them upward using a hammer and drift pin which may not be readily available. And to do this, access to the underside of the bucket is required—a bucket weighing several thousand pounds presents an imposing "positioning task." If the digging edge of the bucket is merely lifted away from the ground (rather than totally inverting the bucket), an individual is required to work beneath the lifted bucket and this presents unnecessary risks.

Some wedge pin arrangements involve an aperture extending horizontally across the width of the tooth tip and tooth base. In theory, wedge pins should then be removable without gaining access to the bottom of the bucket. However, there is often too little space between tooth assemblies to permit either satisfactory wedge pin driving or later pin removal.

An improved device for retaining a digging component which avoids drive pins, which eliminates a need for clear access to the bottom of the bucket and which retains the member by means other than merely friction would be an important advance in the art.

OBJECTS OF THE INVENTION

It is an object of this invention to provide an improved device for retaining a digging component which overcomes some of the problems and shortcomings of the prior art.

Another object of this invention is to provide an improved device for retaining a digging component which avoids driving wedge pins.

Another object of this invention is to provide an improved device for retaining a digging component which eliminates a need for clear access to the bottom of the bucket.

Yet another object of this invention is to provide an improved device for retaining a digging component which retains the member by means other than merely friction.

Another object of this invention is to provide an improved device for retaining a digging component which permits removal of the member by accessing primarily the top of the bucket.

Another object of this invention is to provide an improved device for retaining a digging component which utilizes readily-available tools.

Still another object of this invention is to provide an improved device for retaining a digging component which provides a degree of "self-adjustment." How these and other objects are accomplished will become apparent from the following descriptions and the drawing.

SUMMARY OF THE INVENTION

The invention relates to earthmoving equipment generally and particularly to digging buckets used on such equipment. More particularly, it relates to a device for fastening a tooth assembly or a lip shroud to the lip or riser (the upsweeping portions of a bucket at either end of the lip) of a digging bucket. As used in this specification, the term "lip" is used broadly to mean the lip and/or risers.

A common type of digging bucket has a lip, a lip aperture with a forward surface and a digging component (such as a tooth assembly or a lip shroud) mounted on the lip. A component retaining device comprises a keeper wedge with protrusions bearing against the component and a wedge member interposed between the forward surface and the component.

In the improvement generally, the keeper wedge has at least one angled face and the wedge member has a pair of angled faces. At least one of the angled faces of the wedge member bears against the angled face of the keeper wedge and the wedge member is retained in position by a tension rod such as a bolt extending through the aperture. As the wedge member is "drawn tight," it urges the retaining wedge rearward against the digging component so that such component is also urged rearward to contact the lip and be supported thereby.

In a first embodiment of the improved retaining device, the wedge member includes a pair of retaining wedges and the tension rod extends between such wedges. The wedges are drawn toward one another as the bolt is tightened. Each retaining wedge has a first angled face bearing against an angled face of the keeper wedge so that both wedges cooperate to urge the keeper wedge rearward along a first axis generally normal to the lip.

More specifically, the keeper wedge has a pair of angled faces, each in contact with a separate retaining wedge. The angled face of each retaining wedge bears against a separate angled face of the keeper wedge as the tension rod urges the retaining wedges in opposite directions, i.e., draws them toward one another along a second axis general normal to the first axis.

In the second embodiment, the device includes a wedge seat having a pair of angled faces and interposed between the retaining wedges and the forward surface of the aperture. In this version, each retaining wedge is conical-shaped and has a second angled face. The first angled face of each retaining wedge bears against an angled face of the keeper wedge and the second angled face of each retaining wedge bears against a separate angled face of the wedge seat. When the keeper wedges are drawn together by tightening the bolt, the wedge seat and the keeper wedge are urged in opposite directions along the first axis and the retaining wedges are urged in opposite directions along the second axis.

In the third embodiment, similar to the second embodiment, at least one angled face of each retaining wedge defines an included angle with the second axis of at least 25° so that each "unit" of movement of the retaining wedges, e.g., 0.1 inch, results in somewhat greater movement of the keeper wedge. Thus, a shorter bolt can be used and/or such bolt need not be tightened as many turns. Conveniently, that retaining wedge contacted by the bolt head has a slot receiving the head and preventing rotation thereof. In that way, the installer need not apply a wrench to both the bolt head and the bolt nut being tightened.

In the fourth embodiment, the digging component (tooth assembly or lip shroud) has a slot receiving the head and preventing rotation thereof. This arrangement permits use of a wedge member having but a single retaining wedge while still providing means for preventing bolt head rotation. Further, the forward and rear surfaces of the aperture are angled with respect to one another and, more specifically, the forward surface (unlike such forward surface in other embodiments) is angled with respect to both axes. However, the rear surface is generally normal to the first axis and parallel to the second axis.

Since all embodiments of the inventive retaining device use a tension rod which is very slightly stretched when tightened, the device has some "forgiveness" for wear. That is, as the contacting surfaces of the retaining wedge(s) and keeper wedge wear slightly (as they are likely to do during use), there is a degree of self-adjustment. Therefore, while the device may loosen slightly, it is very unlikely to fall off.

Other details of the invention are set forth in the following detailed description and the drawing.

DETAILED DESCRIPTION OF PREFERRED EMBODIMENTS

Before describing the embodiments of the inventive retaining device 10, it will be helpful to appreciate how bucket digging teeth are used and how tooth assemblies and lip shrouds are conventionally retained. Following these descriptions, details of the new retaining device 10 are provided.

Figure 1:
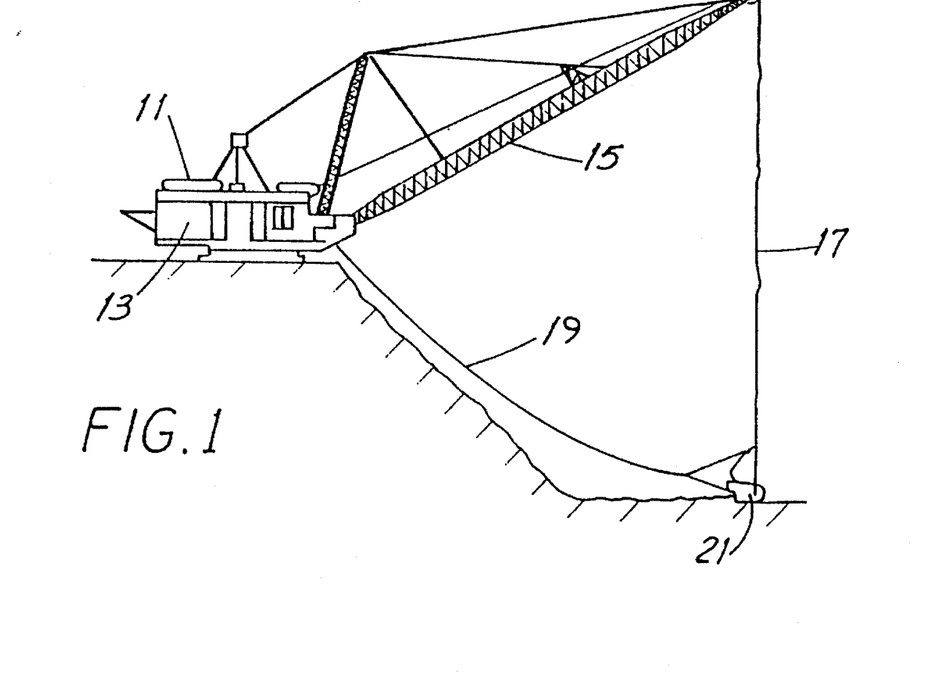
FIG. 1 is a side elevation view of a walking dragline in operation.
Figure 2:
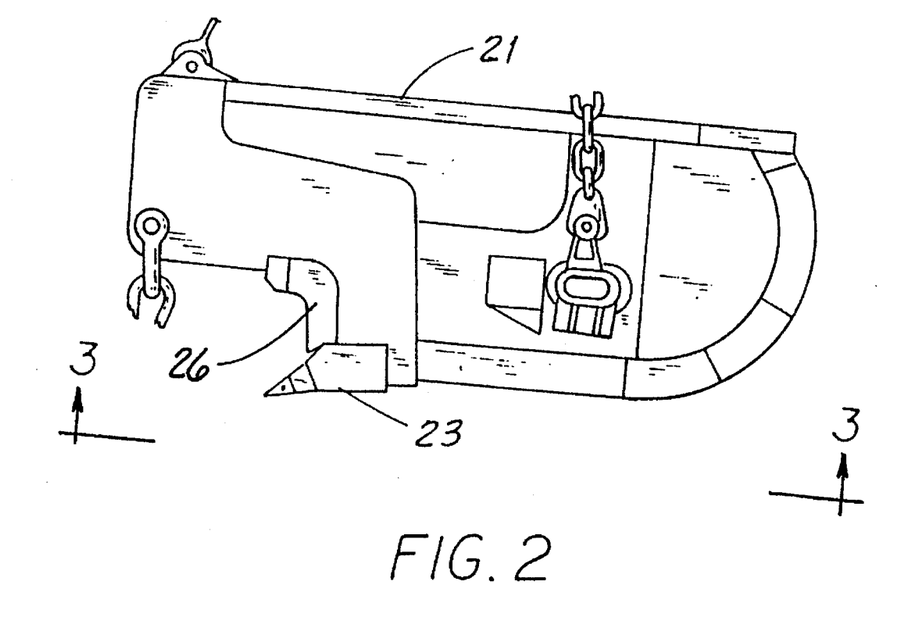
FIG. 2 is a side elevation view of a bucket used on the dragline of FIG. 1.
Figure 3:
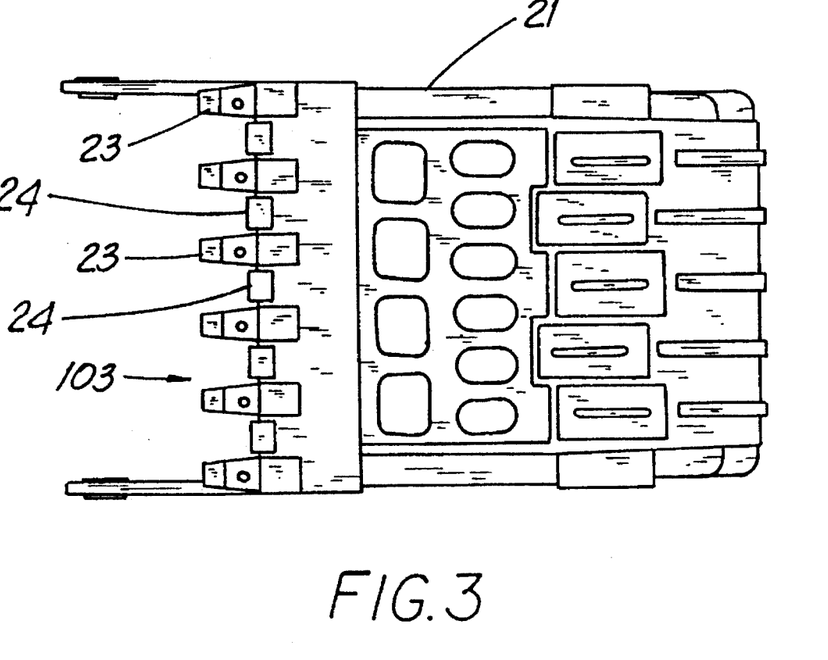
FIG. 3 is a bottom plan view of the bucket of FIG. 2 taken in the viewing plane 3—3 thereof.

Referring to FIGS. 1, 2 and 3, the illustrated walking dragline 11 includes a machinery deck 13, an extended boom 15 and cables 17, 19 hooked to the digging bucket 21. The cable 17 raises and lowers the bucket 21 and the cable 19 draws the bucket 21 toward the dragline 11 to load material into the bucket 21. The bucket teeth 23 and shrouds 24 bite into such material which fills the bucket 21 as it moves. When used with the exemplary dragline 11, such teeth 23 point toward the dragline 11 during digging. The riser 26 may also be equipped with teeth 23. Of course, it should be clearly understood that buckets with replaceable tooth assemblies and lip shrouds are used on a wide variety of digging machines; the illustrated dragline 11 is but one example of such a machine.

Figure 16:
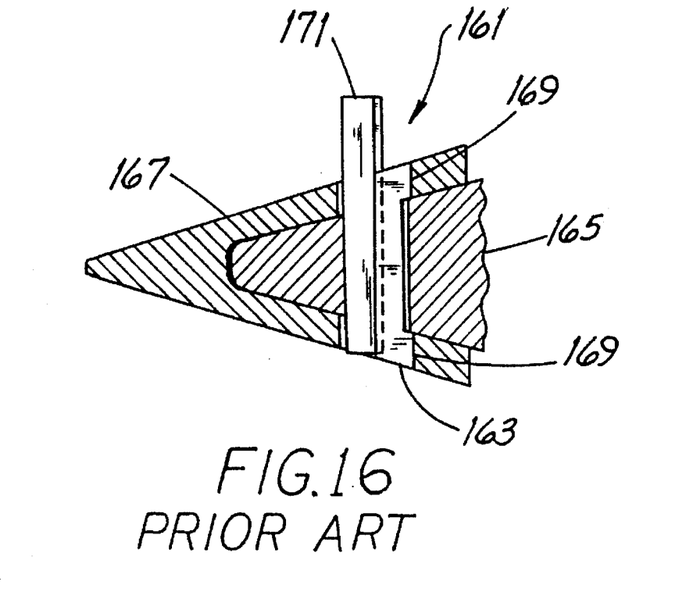
FIG. 16 is a cross-section side elevation view of a prior art retaining device.

Referring to FIG. 16, a prior art retaining assembly 161 includes a wedge block 163 fitted into the aligned apertures of the tooth base 165 and the tooth tip 167. The block 163 is of substantially consistent thickness from top to bottom and has upper and lower protrusions 169 which overlap the base 165, help retain the block 163 in vertical position and help urge the tip 167 tightly onto the base 165 as the wedge pin 171 is driven home. The pin 171 is driven top-down into the opening between the block 163 on one side and the base 165 on the other. Retained solely by friction, the pin 171 must be driven out from the bottom with a drift pin (not shown).

In this specification, terms such as "forward," "rear" and the like are used. Such terms are used with respect to the tip of a digging tooth or the exposed edge of a lip shroud in that "forward" means toward such tip or such edge, "rear" means away from such tip or edge and so forth. Stated otherwise (and by way of example), a "forward" surface is closer to such tip or edge than is a "rear" surface.

Figure 4:
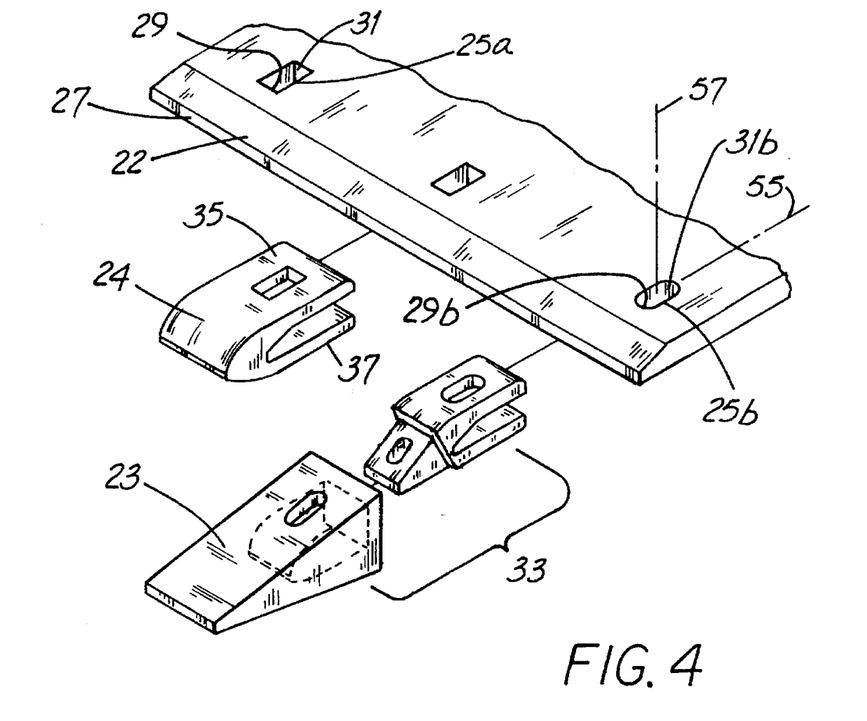
FIG. 4 is an isometric view of a portion of the lip of the bucket of FIGS. 2 and 3 shown in conjunction with a lip shroud and a tooth assembly. Parts are broken away.

Referring also to FIG. 4, the device 10 is described in conjunction with a lip 22 and lip shroud 24 of a digging bucket 21. However, after appreciating the specification, persons of ordinarily skill will readily understand how the invention can be used to mount teeth 23. The lip 22 has several apertures 25 spaced from one another and from the lip front edge 27. Such apertures 25, like aperture 25a, may be rectangular with flat forward and rear surfaces 29, 31 or they may be ovoid like aperture 25b with curved forward and rear surfaces 29b, 31b. Tooth assemblies 33 and shrouds 24 are mounted alternately on the lip 22, each such assembly 33 and shroud 24 being attached to the lip 22 using a separate aperture 25.

The lip shroud 24, which is generally U-shaped in side elevation view, has top and bottom spaced plates 35 and 37, respectively, defining a slot 39 between them for receiving the forward edge 27 of the lip 22. The slot 39 is sized and shaped to conformably fit over the lip 22 "tongue-and-groove" fashion so that the plates 35, 37 and the front surface of the slot 39 are in intimate contact with the lip 22 when the shroud 24 is securely mounted. The outer surface of the shroud 24 is exposed to and digs through material as the bucket 21 is drawn toward the dragline 11.

Figure 5:
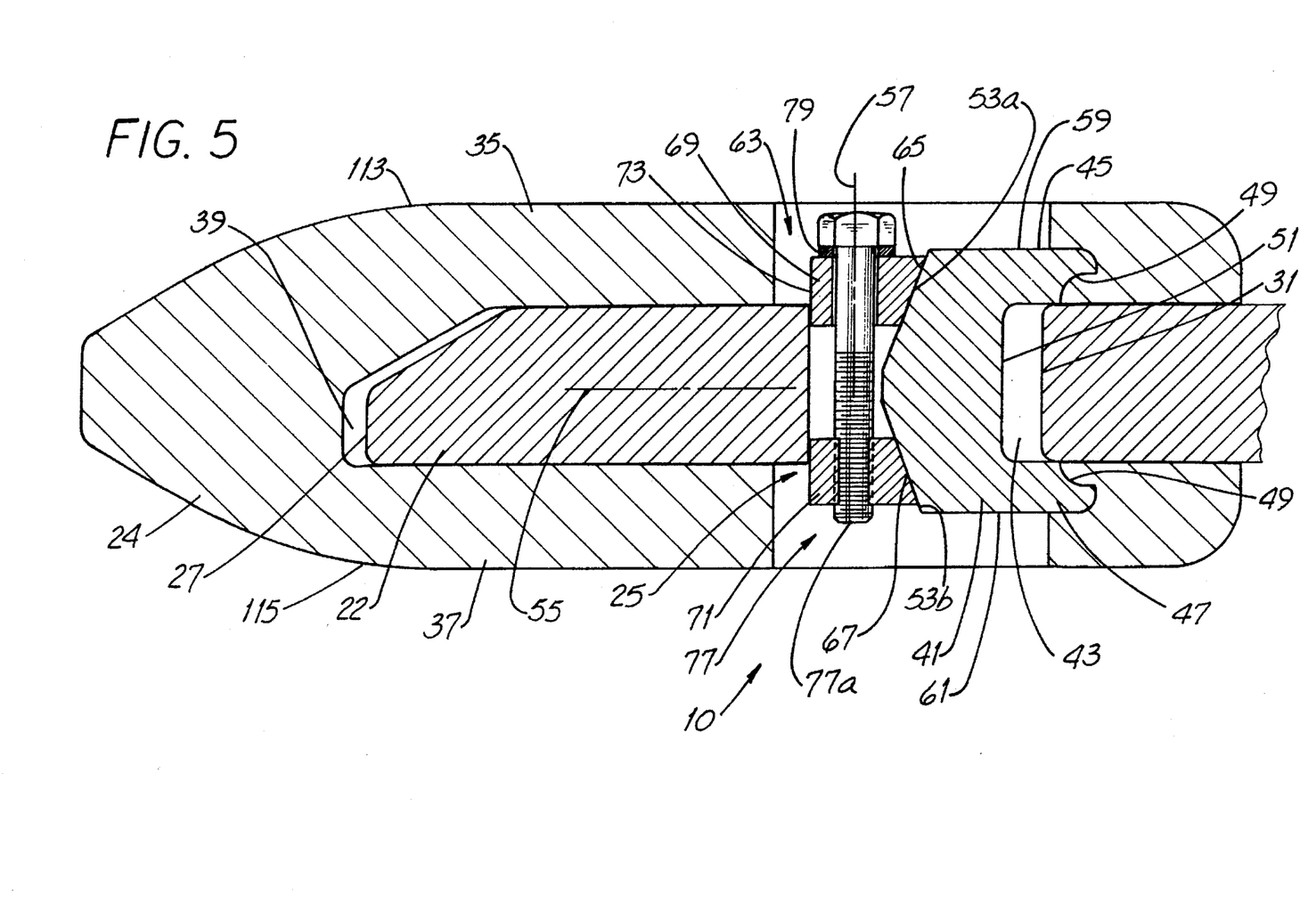
FIG. 5 is a representative cross-section side elevation view of a first embodiment of the retaining device shown in conjunction with the bucket lip and lip shroud. Certain hidden surfaces of parts are shown in dashed outline.

FIGS. 5–10 depict a first embodiment of the device 10 and FIG. 5 also shows the lip 22, the shroud 24 and an aperture 25 used to mount the shroud 24. The device 10 includes a generally C-shaped keeper wedge 41 having a central space 43 bounded by a pair of protrusions 45, 47, each of which contacts a lateral interior edge 49 of the shroud 24. The protrusions 45, 47 are spaced at a dimension only slightly greater than the thickness of the lip 22 and the space 43 is formed to a depth such that when the device 10 is fully tightened, the surface 51 of the keeper wedge 41 is spaced somewhat from the rear surface 31 of the aperture 25.

From this description and from an inspection of FIG. 5, it is apparent that as the keeper wedge 41 is urged rearward (by means described below), it also urges the shroud 24 rearward until the front surface of the slot 39 contacts the lip 22. The shroud 24 is thereby well supported by the lip 22 while yet protecting the lip 22. Those other components of the device 10 which are described below aid in urging the keeper wedge 41 rearward.

Figure 6:
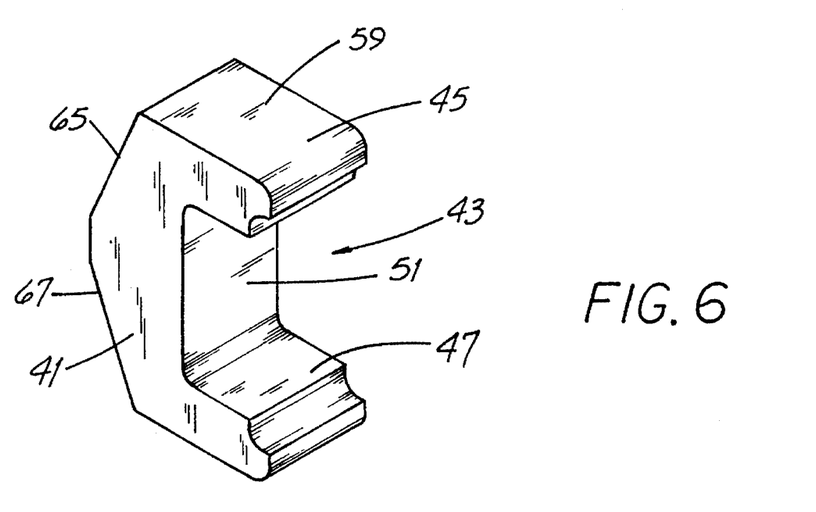
FIG. 6 is an isometric view of the keeper wedge component of the device. Certain hidden surfaces thereof are shown in dashed outline.

The keeper wedge 41 has a least one angled face 53 and in certain of the embodiments, two such faces 53a, 53b are preferred. A first axis 55 extends generally parallel to the lip 22 and a vertical second axis 57 is generally normal to the first axis 55. Each face 53 is angled with respect to each axis 55, 57. The faces 53 define a truncated isosceles triangle and the top and bottom surfaces 59, 61, respectively, of the keeper wedge 41 are generally flat and parallel to one another and normal to the second axis 57.

Figure 7:
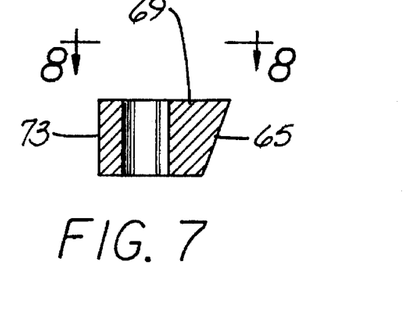
FIG. 7 is a side elevation view of the upper retaining wedge of the device. Certain hidden surfaces thereof are shown in dashed outline.
Figure 8:
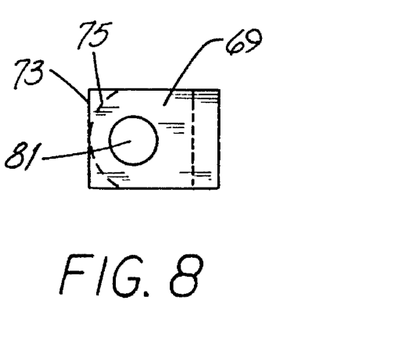
FIG. 8 is a top plan view of the wedge of FIG. 7 taken along the viewing plane 8—8 thereof. An alternate version of such wedge is shown in dashed outline.

The device 10 also includes a wedge member 63 which has a pair of angled faces 65, 67, at least one of which bears against an angled face 53 of the keeper wedge 41. In the first embodiment, the wedge member 63 has a pair of retaining wedges 69 and 71, respectively. The upper retaining wedge 69 has a front face 73 parallel to the second axis 57. Such front face 73 contacts the forward surface 29 of the aperture 25 when the device 10 is installed. Preferably, the shape of the face 73 conforms to that of the forward surface 29 and may be flat as represented by the solid line, curved as represented by the dashed line 75 or of some other shape.

The rear face 65 of the upper wedge 69 is angled with respect to the second axis 57 and bears against and slides along the angled face 53a of the keeper wedge 41 as the tension rod 77, e.g., a bolt 77a, is tightened. The bolt 77a is received through a lock washer 79, through a hole 81 in the upper wedge 69 with slight clearance and extends into a tapped hole 83 in the lower retaining wedge 71. While the tapped hole 83 could be formed in the upper retaining wedge 69, the illustrated arrangement permits an installer to work from the top of (rather than beneath) the bucket 21.

Figure 9:
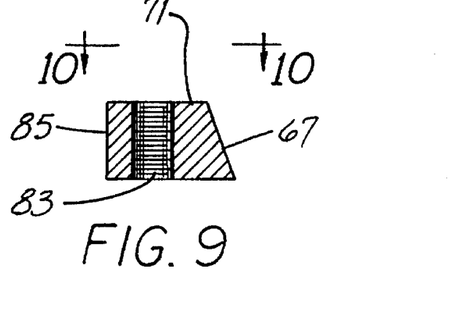
FIG. 9 is a side elevation view of the lower retaining wedge of the device. Certain hidden surfaces thereof are shown in dashed outline.
Figure 10:
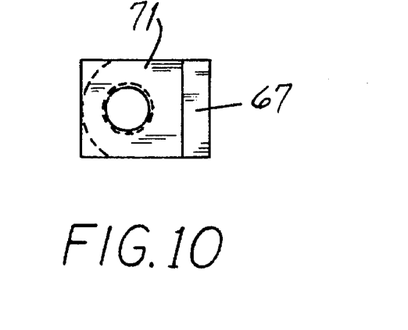
FIG. 10 is a top plan view of the wedge of FIG. 9 taken along the viewing plane 10—10 thereof. An alternate version of such wedge is shown in dashed outline.

Like the upper wedge 69, the lower retaining wedge 71 has a front face 85 parallel to the second axis 57. Such front face 85 also contacts the forward surface 29 of the aperture 25 when the device 10 is securely installed. Preferably, the shape of the face 85 also conforms to that of the forward surface 29 as described above.

The rear face 67 of the lower retaining wedge 71 is also angled with respect to the second axis 57 and bears against and slides along another angled face 53b of the keeper wedge 41 as the bolt 77a is tightened. It is apparent from the foregoing that as the bolt 77a is tightened, the retaining wedges 69, 71 move in opposite directions along the second axis 57. Such retaining wedges 69, 71 and the keeper wedge 41 are also urged in opposite directions along the first axis 55, the retaining wedges 69, 71 being urged forward (to the left in FIG. 5) but without forward movement, and the keeper wedge 41 rearward resulting in slight movement. Thus, the shroud 24 is forced rearward until the front surface of the slot 39 contacts the forward edge 27 of the lip 22.

Figure 11:
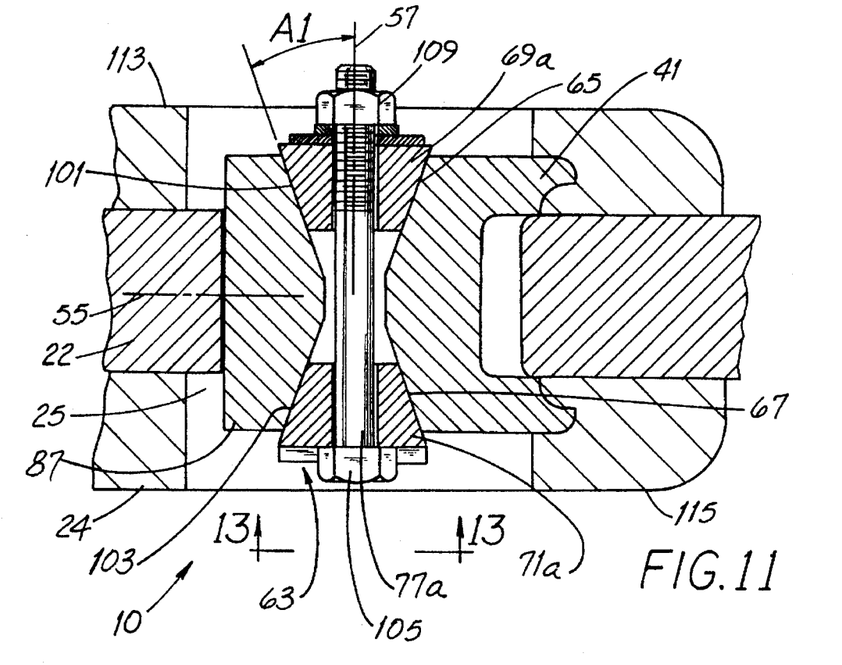
FIG. 11 is a representative cross-section side elevation view of a second embodiment of the retaining device shown in conjunction with the bucket lip and lip shroud. Parts are broken away and certain hidden surfaces of other parts are shown in dashed outline.
Figure 12:
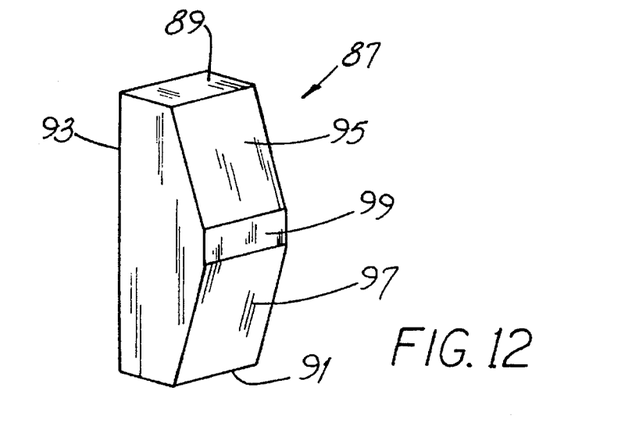
FIG. 12 is an isometric view of the wedge plate component of the device of FIG. 11. Certain hidden surfaces are shown in dashed outline.
Figure 13:
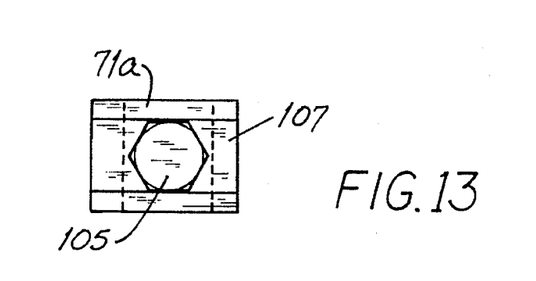
FIG. 13 is a bottom plan view of the lower retaining wedge of the device of FIG. 11 taken along the viewing plane 13—13 thereof. Certain hidden surfaces are shown in dashed outline.

Referring additionally to FIGS. 11-13, a second embodiment of the device 10 includes a wedge seat 87 having generally flat top and bottom surfaces 89, 91, respectively, parallel to one another and to the first axis 55 and generally normal to the second axis 57 and to the seat front surface 93. An angled face 95 or 97 extends from each surface 89 or 91 generally toward the first axis 55 and the faces 95, 97 terminate in a flattened nose portion 99. Such wedge seat 87 is interposed between the retaining wedges 69a, 71a and the forward surface of the aperture 25.

In this embodiment, each retaining wedge 69a, 71a is conical-shaped and has a second angled face 101, 103, respectively. The first angled face 65, 67 of each retaining wedge 69a or 71a bears against an angled face 65 or 67 of the keeper wedge 41 and the second angled face 101 or 103 of each retaining wedge 69a or 71a bears against a separate angled face 101 or 103 of the wedge seat 87.

Conveniently, that retaining wedge 71a contacted by the bolt head 105 has a slot 107 receiving the head 105 and preventing rotation thereof. In that way, the installer need not apply a wrench to both the bolt head 105 and the bolt nut 109 being tightened.

When the retaining wedges 69a, 71a are drawn together by tightening the bolt 77a, the wedge seat 87 and the keeper wedge 41 are urged in opposite directions along the first axis 55 and the retaining wedges 69a, 71a are urged in opposite directions along the second axis 57. That is, the wedge member 63 (comprised in this case of the retaining wedges 69a, 71a) forces the wedge seat 87 and the keeper wedge 41 farther apart to secure the shroud 24 on the lip 22. More specifically, the keeper wedge 41 moves away from the wedge seat 87.

The preferred angle A1 defined by each angled face 101, 103 and the second axis 57 is about 20°. Such angle A1 is relatively shallow and makes bolt tightening and loosening easier, albeit at the "expense" of using a longer bolt 77a.

Figure 14:
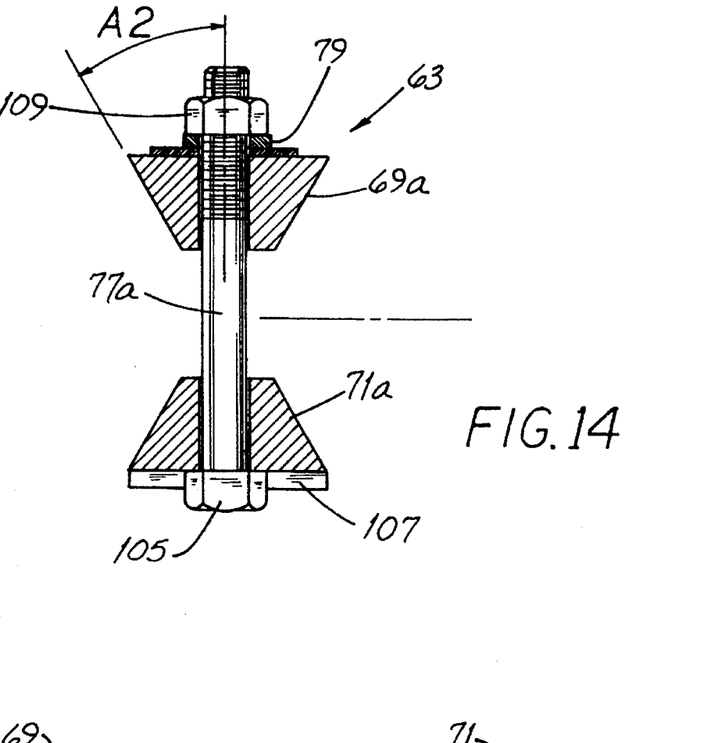
FIG. 14 is a side elevation view of a portion of the third embodiment of the device. Certain hidden surfaces are shown in dashed outline.

Referring additionally to FIG. 14, the third embodiment of the device 10 is similar to the second embodiment described above. A difference is that at least one angled face 65 or 101; 67 or 103 of each retaining wedge 69a, 71a defines an included angle A2 with the second axis 57 of at least 25° so that each "unit" of movement of the retaining wedges 69, 71a, e.g., 0.1 inch, results in somewhat greater movement of the keeper wedge 41. Thus, a shorter bolt 77a can be used and/or such bolt 77a need not be tightened as many turns to secure the shroud 24. And the retaining wedge 71a may also include a bolt "anti-rotation" slot 107 like that shown in FIG. 13.

Figure 15A:
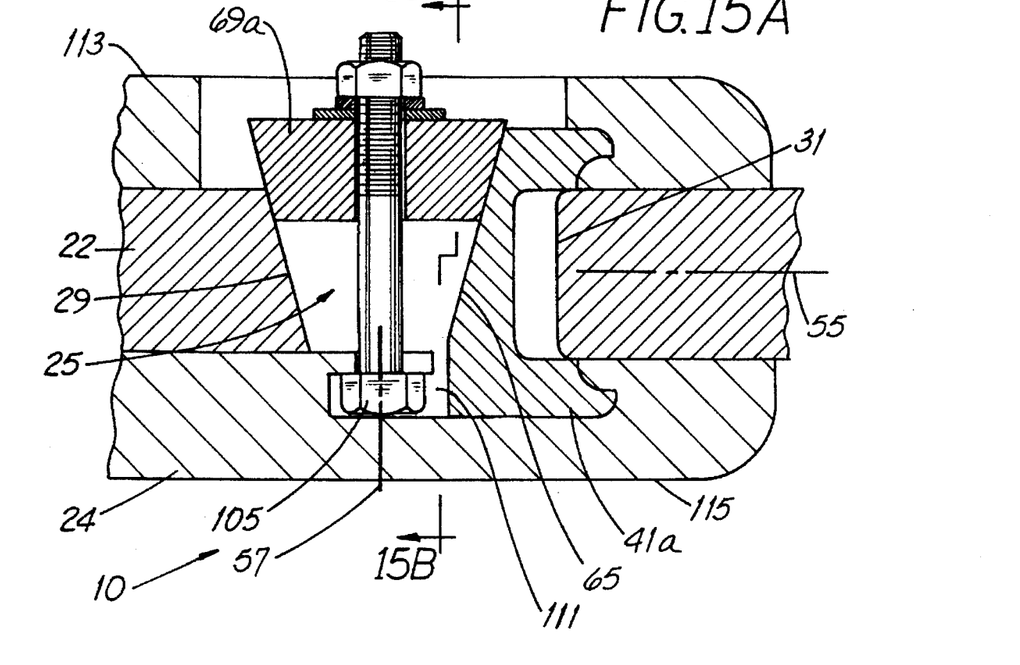
FIG. 15A is a representative cross-section side elevation view of a fourth embodiment of the device. Parts are broken away and certain hidden surfaces are shown in dashed outline.
Figure 15B:
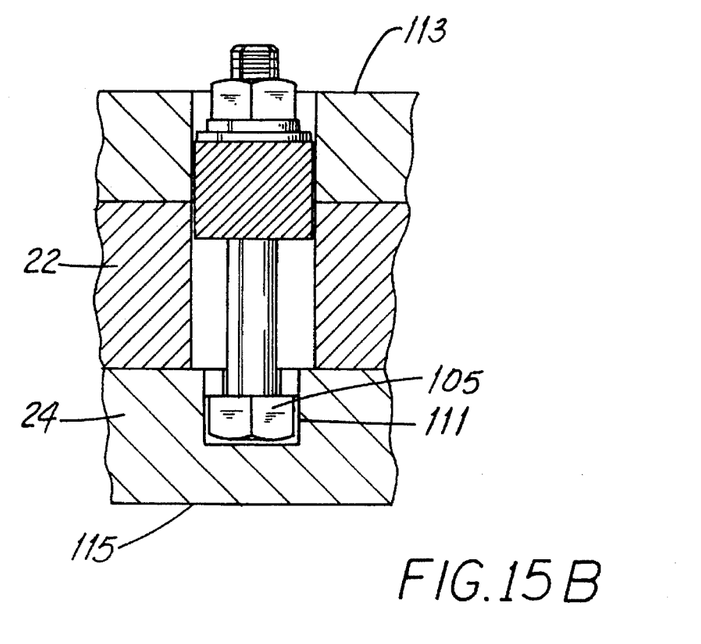
FIG. 15B is a representative cross-section elevation view taken along the viewing section 15B—15B of FIG. 15A.

Referring next to FIGS. 15A and 15B, in the fourth embodiment of the device 10, the digging component (tooth assembly 33 or lip shroud 24) has a slot 111 receiving the bolt head 105 and preventing rotation thereof. This arrangement permits use of a wedge member 63 having but a single retaining wedge 69a while still providing means for preventing bolt head rotation. Further, the forward surface 29 of the aperture 25 is angled with respect to the aperture rear surface 31 and (unlike such forward surface 29 in other embodiments) is angled with respect to both axes 55, 57. However, the rear surface 31 of the aperture 25 is generally normal to the first axis 55 and parallel to the second axis 57.

The keeper wedge 41a of the fourth embodiment differs somewhat from that of the other embodiments in that such wedge 41a has but a single angled face 65 against which the retaining wedge 69a bears. Such face 65 is angled with respect to both axes 55, 57.

Since all embodiments of the inventive retaining device 10 use a tension rod 77 which stretches very slightly when tightened, the device 10 has some "forgiveness" for wear. That is, the rod 77 "behaves like" a very high rate spring. As the contacting surfaces of the retaining wedge(s) 65, 67, keeper wedge 41, 41a, forward aperture surface 29 and wedge seat 87 (as the case may be) wear slightly as they are likely to do during use, there is a degree of self-adjustment since the stretched rod 77 urges the retaining wedge(s) 65, 67 toward one another and takes up any clearance which might otherwise form. Therefore, the device 10 does not become loose except, possibly, after substantial wear.

It is also apparent from the FIGURES that the retaining device 10 is entirely or substantially entirely "nested" between the upper and lower surfaces 113 and 115, respectively, of the shroud 24. The device 10 is thereby better protected from being struck by rock, mineral, earth or the like sliding along such surfaces 113, 115 and into the bucket 21.

While the principles of the invention have been shown and described in connection with specific embodiments, it is to be understood clearly that such embodiments are by way of example and are not limiting.

We claim:

1. In a digging bucket having a bottom surface, a lip with generally planar top and bottom surfaces extending along the length of the lip, a lip aperture with a forward surface, a digging component mounted on the lip and having a top surface and a bottom surface, and a component retaining device comprising (a) a keeper wedge with protrusions bearing against the component and (b) a wedge member interposed between the forward surface and the component, the improvement wherein:

the keeper wedge has upper and lower protrusions, each having a generally planar interior surface extending across the width of the protrusion;

the interior surfaces of the upper and lower protrusions contact the top and bottom surfaces, respectively, of the lip;

the wedge member is retained in position by a threaded tension rod extending through the aperture; and the tension rod is accessible and removable through the top surface of the digging component, thereby permitting attachment and removal of the digging component while avoiding access to the bucket bottom surface.

2. The bucket of claim 1 wherein:

the wedge member includes a pair of retaining wedges;

each retaining wedge has a first angled face bearing against an angled face of the keeper wedge; and, the tension rod extends between the retaining wedges and when the bucket is generally horizontal, the tension rod is generally vertical.

3. The bucket of claim 2 wherein the angled face of each retaining wedge bears against a separate angled face of the keeper wedge and the tension rod urges the wedges in opposite directions.

4. The bucket of claim 3 including a first axis generally parallel to the lip and a second axis generally normal to the first axis and wherein the keeper wedge is urged along the first axis, the retaining wedges are urged along the second axis and one of the retaining wedges is urged upward along such second axis as the tension rod is tightened.

5. The bucket of claim 2 further including a wedge seat interposed between the retaining wedges and the forward surface of the aperture and wherein:

the lip has a forward edge; and the wedge seat bears against the lip, thereby exerting force urging the digging component against the forward edge.

6. The bucket of claim 5 wherein, when the tension rod is tightened, (a) the tension rod urges the retaining wedges in opposite directions, and (b) one of the retaining wedges is urged upward.

7. The bucket of claim 6 wherein:

the keeper wedge and the wedge seat are urged along a first axis generally parallel to the lip; and, the retaining wedges are urged along a second axis general normal to the first axis.

8. The bucket of claim 7 wherein the keeper wedge and the wedge seat are urged in opposite directions along the first axis.

9. The bucket of claim 5 wherein:

the tension rod is a bolt having a head; and, a retaining wedge has a slot receiving the head and preventing rotation thereof.

10. The bucket of claim 1 wherein:

the tension rod is a bolt having a head; and, the digging component has a slot receiving the head and preventing rotation thereof.

11. The bucket of claim 10 wherein the aperture has a rear surface and the forward and rear surfaces of the aperture are angled with respect to one another.

12. The bucket of claim 11 including a first axis generally parallel to the lip and a second axis generally normal to the first axis and wherein:

the wedge member includes a retaining wedge;

the keeper wedge is urged along the first axis; and, the retaining wedge is urged upward along the second axis.

13. The bucket of claim 12 wherein the rear surface is generally parallel to the second axis.

* * * * *